United States Patent [19]

Harrison et al.

[11] 4,405,211
[45] Sep. 20, 1983

[54] LIQUID CRYSTAL COMPOSITIONS WITH PLEOCHROIC ANTHRAQUINONE DYES

[75] Inventors: Kenneth J. Harrison, Malvern Link; Edward P. Raynes, Malvern; Frances C. Saunders, Malvern Wells; David J. Thompson, Whitefield, all of England

[73] Assignee: The Secretary of State for Defence in Her Britannic Majesty's Government of the United Kingdom of Great Britain and Northern Ireland, London, England

[21] Appl. No.: 287,118

[22] Filed: Jul. 27, 1981

[30] Foreign Application Priority Data

Jul. 29, 1980 [GB] United Kingdom ............... 8024797

[51] Int. Cl.³ .......................... G02F 1/13; C09K 3/34
[52] U.S. Cl. ................................. 350/349; 252/299.1; 260/369; 260/378; 260/380; 260/383
[58] Field of Search ....................... 252/299.1; 350/349

[56] References Cited

U.S. PATENT DOCUMENTS

| | | | |
|---|---|---|---|
| 4,032,219 | 6/1977 | Constant et al. ............... | 252/299.1 |
| 4,232,949 | 11/1980 | Huffman ........................ | 252/299.1 |
| 4,232,950 | 11/1980 | Benham ......................... | 252/299.1 |
| 4,273,929 | 6/1981 | Boller et al. .................. | 252/299.1 |
| 4,299,720 | 11/1981 | Osman et al. ................. | 252/299.1 |
| 4,304,683 | 12/1981 | Moriiyaka et al. ............ | 252/299.1 |
| 4,363,743 | 12/1982 | Moeller et al. ................ | 252/299.1 |

FOREIGN PATENT DOCUMENTS

| | | | |
|---|---|---|---|
| 2104 | 5/1979 | European Pat. Off. ......... | 252/299.1 |
| 25809 | 4/1981 | European Pat. Off. ......... | 252/299.1 |
| 26004 | 4/1981 | European Pat. Off. ......... | 252/299.1 |
| 2920730 | 11/1979 | Fed. Rep. of Germany ... | 252/299.1 |
| 3009974 | 9/1980 | Fed. Rep. of Germany ... | 252/299.1 |
| 3028593 | 2/1981 | Fed. Rep. of Germany ... | 252/299.1 |
| 3036853 | 4/1981 | Fed. Rep. of Germany ... | 252/299.1 |
| 3038372 | 5/1981 | Fed. Rep. of Germany ... | 252/299.1 |
| 55-127485 | 10/1980 | Japan ............................. | 252/299.1 |
| 2037803 | 7/1980 | United Kingdom ............. | 252/299.1 |
| 2069518 | 8/1981 | United Kingdom ............. | 252/299.1 |

OTHER PUBLICATIONS

Bloom, A., et al., Mol. Cryst. Liq. Cryst., vol. 41, (Letters), pp. 1–4 (1977).
Cochard, J. et al., Mol. Cryst. Liq. Cryst., vol. 70, pp. 1–19, (1981).
Saeva, F. D., Xerox Discl. J., vol. 1, Nos. 9/10, pp. 61–62, (1976).

Primary Examiner—Teddy S. Gron
Attorney, Agent, or Firm—Cushman, Darby & Cushman

[57] ABSTRACT

A material suitable for a guest-host liquid crystal device comprises a solution of a liquid crystal material and a pleochroic dye wherein the pleochroic dye comprises at least one compound having a formula:

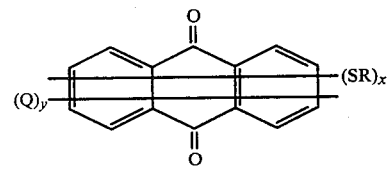

Formula (I)

wherein:
R represents a group selected from optionally substituted alkyl and optionally substituted monocyclic aryl;
Q represents a group selected from halo, OH, —NO$_2$, alkyl, aryl and —NR$_1$R$_2$, wherein each of R$_1$ and R$_2$ independently represents a group selected from H, alkyl and aryl;
x represents an integer from 1 to 4; and
y represents an integer from 0 to 4;
x+y being in the inclusive range 2 to 4;
provided that when x+y=2, x=1 and y=1.

44 Claims, 3 Drawing Figures

LIQUID CRYSTAL COMPOSITIONS WITH PLEOCHROIC ANTHRAQUINONE DYES

The present invention is concerned with organic materials, in particular with pleochroic dyes in solution with liquid crystal materials e.g. for electro-optic display applications.

Liquid crystal materials are well known organic materials which display phases, known as liquid crystal phases or mesophases, having a degree of molecular ordering intermediate between that of the fully ordered crystalline solid state and the fully disordered isotropic liquid state.

Electro-optical devices incorporating liquid crystal materials are well known and widely used as digital displays in such applications as watches, calculators and digital voltmeters. These devices utilise the optical contrast when an electric field is applied across a thin insulating film of suitable liquid crystal material. The molecules of the material (in a liquid crystal phase at the temperature of operation) are re-orientated by the field causing a change in an optical property of the part of the film where the field is applied, e.g. a change in ambient light scattering or transmissivity.

Liquid crystal materials have the property that their molecules can impose their ordering upon the molecules of other suitable dopant materials incorporated within them. This property is the basis of so-called "guest-host" devices e.g. display devices in which the host liquid crystal material and its guest material have one molecular configuration in the absence of an applied electric field and another molecular configuration when an electric field is applied across the material. The guest material is usually a pleochroic dye, whch is a dye whose molecular absorption properties vary with the orientation of the electric vector of light incident upon its molecules.

The presence of such a dye can be used to enhance the contrast between the off state (with no electric field applied) and the on state (with electric field applied) of a liquid crystal display because the orientation of the dye molecules is in effect switchable by the effect of the applied electric field on the liquid crystal molecules and by the consequent re-orientation of the dye molecules by the guest-host effect.

As discussed further below there are several kinds of liquid crystal effects which can make use of the guest-host effect in electro-optical displays. These vary according to the kind of liquid crystal material used and the configuration of its molecules in the off state (e.g. as determined by the surface treatments of the substrates employed to contain the film of liquid crystal material).

In order to provide maximum contrast between the on and off states of a guest-host liquid crystal display it is important that the guest molecules adopt as closely as possible the time averaged orientation of the host molecules. However this is achieved only to a limited degree because of random thermal fluctuations. The degree to which the orientation varies from the ideal is measured by a quantity known as the order parameter S which is given by the following equation:

$$S = \tfrac{1}{2}(3 \cos^2\theta - 1) \qquad \text{Equation (1)}$$

where $\cos^2\theta$ is a time averaged term and $\theta$ is the instantaneous angular orientation of the molecules with respect to the time averaged orientation of the host molecules. The determination of the value of the order parameter S is well understood in the art; see for example the paper "A new absorptive mode reflective liquid crystal display device" by D. L. White and G. N. Taylor in the Journal of Applied Physics, 1974, 45 pages 4718 to 4723.

For perfect orientation the order parameter S is unit (that is $\theta$ is zero). Thus, pleochroic dyes for use in guest-host devices should have an order parameter in the liquid crystal host as high as possible (i.e. less than one but as near to one as possible). However they must also have adequate chemical, photochemical and electrochemical stability, e.g. stability when exposed to atmospheric contaminants, electric fields (as in device operation) and to ultra-violet radiation. They should not be ionic or have any ionisable character (otherwise the liquid crystal material will lose its insulating nature and conduct making the device useless). They must also have sufficient solubility in the host materials; although the concentration of guest pleochroic dye required for the desired effect is generally quite small (e.g. not more than a few percent of dye) nevertheless many pleochroic dyes are unsuitable because they are essentially insoluble in liquid crystal materials.

Selection of a suitable pleochroic dye usually involves a compromise between these various properties.

Although a vast number of dyes are known only a very small proportion of these have been proposed for use with liquid crystal materials owing to the need to achieve a suitable combination of the properties mentioned above.

European Patent Specification No. 2104A describes a series of anthraquinone pleochroic dyes suitable for use with liquid crystal materials. These dyes, which are commercially available, largely show good stability properties and reasonable solubility. However their order parameters are generally rather low, typically 0.6 in the cyanobiphenyl/terphenyl host material E7, whose composition is given below. (Although two examples of dyes having an order parameter of about 0.7 in E7 are quoted in the said European Specification one of these dyes is relatively unstable and the other is fairly insoluble in liquid crystal materials.)

According to the present invention in a first aspect a material suitable for a guest-host liquid crystal device comprises a solution of a liquid crystal material and a pleochroic dye wherein the pleochroic dye comprises at least one compound having a formula:

Formula (I)

wherein:

R represents anoptionally substituted alkyl or monocyclic aryl radical;

Q represents halo, OH, $-NO_2$, alkyl, aryl or $-NR_1R_2$, wherein each of $R_1$ and $R_2$ independently represents H, alkyl or aryl;

x represents an integer from 1 to 4; and y represents an integer from 0 to 4;

x represents an integer from 1 to 4; and y represents an integer from 0 to 4;

x+y being in the inclusive range 2 to 8; provided that when x+y=2, x=1 and y=1. Preferably x+y is in the inclusive range 2 to 5, especially 2 to 4.

Preferably, NR₁R₂ is NHR' where R' is H, monocyclic aryl, especially phenyl or substituted phenyl, or optionally substituted alkyl containing from 1 to 5 carbon atoms. Preferred optional substituents where R' is substituted alkyl are lower alkoxy, OH and monocyclic aryl.

Preferably, R is monocyclic aryl, especially phenyl or substituted phenyl.

Where R or Q is alkyl it preferably contains up to 10 carbon atoms in a straight or branched chain and more preferably contains from 3 to 10 carbon atoms. As optional substituents there are preferred lower alkoxy, OH and monocyclic aryl.

Where Q is monocyclic aryl it is preferably phenyl or substituted phenyl.

Where R, Q, R₁, R₂ or R' is substituted phenyl it is preferably substituted by a lower alkyl, lower alkoxy, halo, NO₂, OH or NR₁R₂ group (where NR₁R₂ is defined above)-which may be the same as or different from the aforementioned group NR₁R₂. The substituents are preferably in the meta or para position relative to the link with the anthraquinone nucleus. Preferred halo substituents are chloro and bromo.

Within the general class of compounds represented by Formula (I) a preferred sub-class of dyes may be represented by the formula:

Formula (II)

wherein each of A, B and C independently represents H, —SR or —NR₁R₂ and Q and y are as previously defined.

Many of the dyes of Formula (I), particularly those of Formula (II), have been found to show particularly good stability and reasonable solubility as well as reasonably high order parameters in liquid crystal material, eg biphenyl-based material, making them more attractive than the dyes disclosed in European Patent Specification No. 2104A.

Particular mention may be made of dyes of Formula (II) wherein y=0 and wherein of the three groups A, B and C two are —SR groups and the third is H; and of dyes of Formula (II) wherein y=0 and of the three groups A, B and C one is —NR₁R₂ and the other two are hydrogen or one is hydrogen and the other two are —NR₁R₂ groups. A number of dyes of these forms have been found to show exceptionally high solubility as well as high order parameter in liquid crystal material (as exemplified below).

Other preferred dyes within the sub-class represented by Formula (II) are those in which y=0 and A=B=-C=—SR; A=—SR and B=C=NR₁R₂; B=—SR and A=C=—NR₁R₂; C=—SR and A=B=—NR₁R₂; A=B=C=—NR₁R₂; A=C=B=H; A=B=SR and C=NR₁R₂; A=C=—SR and B=NR₁R₂; and A=NR₁R₂ and B=C=SR.

Since the filing of UK Patent Application No. 8024797 from which we have claimed priority in the present Application, we have become aware of U.K. Patent Application No. GB 2043097A and U.S. Pat. No. 4,232,949, both published after the filing of U.K. Patent Application No. 8024797.

In the said published U.K. Application and U.S. Patent liquid crystal compositions having a positive dielectric anisotropy have been proposed which contain anthraquinone dyes. These include dyes having the following formula:

Formula (A)

wherein R' represents hydrogen or a non-ionic substituent, and the two groups are present only in α-positions ie 1,4; 1,5; 1,8; 4,5 or 4,8.

The teaching in the said published U.K. Application and U.S. Patent gives the impression to those skilled in the art that anthraquinone dyes containing thiophenyl or substituted thiophenyl groups, which are useful for addition to liquid crystal material, are limited to the dyes of Formula (A) and that the liquid crystal material must have a positive dielectric anisotropy.

However, as taught in the present specification we have found unexpectedly that dyes of Formula (I) and (II) provide another class of dyes which are useful in liquid crystal material which may also contain thiophenyl or substituted thiophenyl groups. For use with dyes of Formula (I) and (II) the liquid crystal material is not limited to material having a positive dielectric anisotropy: it may have a negative dielectric anistropy.

Although the order parameters quoted for the examples of dyes of Formula (A) in the said published U.K. Application and U.S. Patent are reasonably high the dyes of Formula (A), including the examples given, are all yellow dyes (having an absorption peak at 430 to 460 nm).

In contrast, the dyes of Formula (I), which can also have a reasonably high order parameter (as exemplified below), belong to a class wherein different dyes of the class may be provided with different colours (which may be other than yellow)-eg orange, red and blue. This facilitates the production of dye mixtures, to enhance spectral absorption.

Furthermore, it has surprisingly been found, as mentioned above, that certain dyes of Formula (II) show exceptionally high solubility (3% or greater by weight) in liquid crystal material (Host B as defined below at 20° C.). This should be compared with the much lower solubility (1.7% by weight or less at 20° C. in Host B) for compounds of Formula (A), namely 1,5 bis(phenylthio)anthraquinone and 1,5 bis[4-t-butylphenylthio]anthraquinone.

The liquid crystal material (host material) in which the dye of Formula (I) is dissolved in the first aspect above is not critical since a dye which shows reasonable solubility in one liquid crystal material is likely to show reasonable solubility in other liquid crystal materials and also a dye which gives an improved order parameter in one liquid crystal material is likely to give an improved order parameter in other liquid crystal materials, as most popular liquid crystal materials have a similar rod-like molecular shape; however the order parameter of any dye will vary to a limited extent from host-to-host.

Suitable host materials include:

a. mixtures having a positive dielectric anisotropy incorporating cyanobiphenyls preferably together with a few percent of a compound having a clearing point (liquid crystal to isotropic liquid transition) above 150° C. (eg a cyano-p-terphenyl) such as the material E7, marketed by BDH Chemicals Ltd, of Broom Road, Poole, Dorset, England; (composition given below.)

b. mixtures having a positive dielectric anisotropy incorporating cyanophenylcyclohexane compounds preferably together also with a few percent of a high clearing point compound such as a cyanobiphenyl cyclohexane compound, eg the material ZLI 1132;

c. mixtures having a positive dielectric anisotropy incorporating at least one cyanobiphenyl and at least one cyanophenylpyrimidine, preferably together also with a few percent of a high clearing point compound, eg a cyanophenylpyrimidinephenyl compound, eg the material ROTN 30;

d. mixtures incorporating esters, eg containing bicyclo(2,2,2)octane and benzene rings; these generally have a weakly positive or negative dielectric anisotropy but the magnitude of the dielectric anisotropy may be enhanced by the addition of a dopant liquid crystal material having a strongly positive or strongly negative dielectric anisotropy as appropriate; suitable negative dopants are the dicyano compounds which are specified in claim 2 of U.K. Patent Application No. 2,061,256A;

e. any other liquid crystal material incorporating one or more compounds selected from the following known families (where R=alkyl):

i ii iii iv v

-continued vi vii viii ix x xi xii xiii xiv xv xvi xvii xviii

-continued or derivatives of any of the these containing benzene rings wherein the benzene rings contain one or more substituents, eg fluoro;
where is a trans-1,4 substituted cyclohexane ring, is a 1,4 substituted bicyclo(2.2.2)octane ring, $X_1$ is a 1,4 phenylene group or a 4,4′ biphenylyl group or a 2,6 naphthyl group and $Y_1$ is CN, or $R^1$, or $OR^1$ or $CO.O-X_1-Y^1$ where $Y^1$ is CN, or $R^1$ or $OR^1$; the definition of $R^1$ being the same as that of R.

Preferably, the dye/liquid crystal solution contains at least 0.5% by weight of the dye and preferably between about 0.75% and 5% by weight of the dye or more (possibly up to 10% by weight).

Solutions of dye and liquid crystal material may be made in a conventional way simply by mixing the dye and the liquid crystal material together and then heating the mixture at about 80° C. with stirring for about 10 minutes and then allowing the mixture to cool.

Pleochroic dyes of Formula (I) above may be mixed together with other dyes (which may or may not also be of Formula (I)) to extend their spectral absorption properties (when dissolved in liquid crystal material). For example, where a dye of Formula (I) is a yellow or red dye it may be mixed with a red or yellow dye respectively and a blue dye. Alternatively, where a dye of Formula (I) is orange it may be mixed together with a blue dye, optionally together with a yellow and/or red dye. The relative proportions of the dyes mixed together are determined by the desired spectral response as determined by the extenction coefficients of the constituent dye compounds. The dye mixture is then used with liquid crystal material as above or as follows.

According to the present invention in a second aspect a liquid crystal electro-optical display includes two electrically insulating substrates at least one of which is optically transparent, electrodes on the inner surfaces of the substrates and a film of dielectric material contained between the electrodes and substrates, wherein the dielectric material is material according to the first aspect of the invention as defined above.

The liquid crystal/dye solution which is the material according to the first aspect of the invention may be used in any known electro-optical display as defined in the second aspect. Examples, which will be familiar to those skilled in the liquid crystal art, are the known devices operating by the following effects a. THE TWISTED NEMATIC EFFECT

In this case a film of nematic liquid crystal material of positive dielectric anisotropy has an off state in which (the long axes of) its molecules lie in the plane of the device substrate inner surfaces (which are normally parallel to one another), or at a small angle thereto, and undergo roughly a $\pi/2$ helical twist in orientation from one substrate to the other by virtue of the orientations at the surfaces caused by treatment, eg unidirectional rubbing, of those surfaces prior to assembly. This is the twisted "homogeneous texture". Application of an electric field between the electrodes on the respective substrate inner surfaces to give the on state causes re-arrangement of the liquid crystal molecules to lie (with their long axes) effectively perpendicular to the substrate inner surfaces in the "homeotropic texture". A change in optical activity (rotary power) of the film occurs between the on and off states by virtue of the molecular re-arrangement and the optical effect observed can be enhanced by the use of a linear polariser adjacent to one of the substrates and pleochroic dye dissolved in the liquid crystal material. The polariser has its polarisation axis parallel to the direction of the liquid crystal molecules at the adjacent substrate inner surface (or, more strictly, parallel to the average axis of projection of the molecules on that surface). By the guest-host effect the dye causes the off state to appear relatively dark or strongly colour whereas the on state appears clear or weakly coloured.

b. THE FRÉEDERICKSZ EFFECT IN NEGATIVE NEMATICS

In this case a film of nematic liquid crystal material of negative dielectric anisotropy has an off state in which its molecules lie perpendicular (ie in the homeotropic texture) to the substrate inner surfaces (which are parallel) by virtue of surface treatments to these inner surfaces prior to assembly. A single polariser is placed adjacent to one substrate with its transmission axis perpendicular to the normal to the inner surfaces. Application of an electric field between the electrodes on the respective substrate inner surfaces to give the on state causes re-arrangement of the liquid crystal molecules to lie parallel to the substrate inner surfaces (ie in the homogeneous texture). Incorporation of pleochroic dye in the liquid crystal material ensures that the off state appears relatively clear or weakly coloured whereas the on state appears dark or strongly coloured. The effect observed is enhanced by the presence of the polariser.

c. THE FRÉEDERICKSZ EFFECT IN POSTIVE NEMATICS

In this case a nematic liquid crystal material of positive dielectric anisotropy has an off state in which the molecules lie roughly parallel and in the plane of the substrate inner surfaces (which are parallel) by virtue of treatment of those surfaces prior to assembly (ie the homogeneous texture). A single polariser is placed adjacent to one substrate with its transmission axis parallel to the substrate inner surfaces.

Application of an electric field between the electrodes on the respective substrate inner surfaces to give the on state causes re-arrangement of the liquid crystal molecules to lie perpendicular to the substrate inner surfaces, ie the homeotropic texture. Incorporation of pleochroic dye in the liquid crystal material ensures that the off state appears relatively dark or strongly coloured whereas the on state appears colourless or weakly coloured as in the twisted nematic effect above. The effect observed is enhanced by the presence of the polariser.

d. THE PHASE CHANGE EFFECT (NEGATIVE CONTRAST TYPE)

In this case a cholesteric liquid crystal material of positive dielectric anisotropy and long molecular helical pitch, typically 3 μm, has an off state in which its molecules lie in random helices, ie the "focal conic texture". Application of an electric field between the electrodes on the respective substrate inner surfaces to give the on state causes re-arrangement of the liquid crystal molecules to lie perpendicular to the substrate inner surfaces (ie the homeotropic texture as for postive nematics in the Fréedericksz effect). Incorporation of pleochroic dye in the liquid crystal material gives an off state which appears relatively dark or strongly coloured and an on state which appears colourless or weakly coloured.

e. THE PHASE CHANGE EFFECT (POSITIVE CONTRAST TYPE)

In this case a cholesteric liquid crystal material of negative dielectric anisotropy and long molecular helical pitch has an off state in which its molecules lie perpendicular to the substrate inner surfaces, ie in the homeotropic texture. Application of an electric field between electrodes on the respective substrate inner surfaces causes re-orientation of the molecules to lie in the plane of the substrate inner surfaces in a helical arrangement ie the twisted homogeneous texture. Incorporation of pleochroic dye in the liquid crystal material gives an off state which is relatively colourless or weakly coloured and an on state which is relatively dark or strongly coloured.

f. THE FRÉEDERICKSZ EFFECT IN SMECTICS

In this case a smectic A liquid crystal material of positive dielectric anisotropy having a dielectric relaxation frequency fc less than about 10 kHz (ie the material has a negative dielectric anisotropy above this frequency) has an off state in which its molecules lie roughly parallel to the substrate inner surfaces with the molecules at the two inner surfaces parallel as in the Freedericksz effect (c). Application of an electric field with a frequency less than fc to give the on state causes re-orientation of the liquid crystal molecules to lie perpendicular to the substrate inner surfaces, is in the homeotropic texture. The on state is preserved when the field is removed. Clearing of the on state may be achieved by the application of a high frequency electric field, ie with a frequency>fc. A single polariser is used, as with the Freedericksz effect (c) above, when the molecular alignment at the two substrate inner surfaces in the off state is parallel. Incorporation of pleochroic dye in the liquid crystal material gives an off state which is relatively dark or strongly coloured and an on state which is clear or weakly coloured.

Use of the material defined in the first aspect of the invention above is not limited to electro-optical displays (as defined in the second aspect). The material may, in fact, be used in any known application of a dyed liquid crystal material. An example of such a 'non electro-optical' application is a thermally addressed display in which a symbol or character is provided in a smectic or cholesteric material by selective heating of the material eg by a laser (eg He/Ne) beam, to produce a localised change in the molecular texture of the material. The dye enhances the contrast between the different regions of the display, ie between those which are selectively heated and those which are not heated.

Anthraquinone dyes falling within the scope of Formula (I), and methods for their preparation, have been described in the prior art. Thus, methods for the preparation of alpha-phenylthioanthraquinones have been described in United Kingdom Patent Specification No. 1,105,568. In general, such methods involve reacting an anthraquinone compound have replaceable substituents in the alpha positioning with a thiophenol in the presence of a base and a suitable reaction medium. Betaphenylthioanthraquinones may be prepared in an analogous manner.

For the purposes of the present invention, the anthraquinone compounds of Formula (I) should be of extremely high purity as will be obvious to those skilled in the art. Purification may be effected using conventional methods such as recrystallisation from suitable solvents and chromatography.

Examples of the preparation and properties of dye compounds having Formula (I) will now be given:

Formula (III)

EXAMPLE 1

Preparation of Compound No 1: 1,5-bis(phenylthio) anthraquinone.

1,5-Dichloroanthraquinone (100 parts) is added at room temperature with stirring to a mixture of dimethylformamide (474 parts), thiophenol (135 parts) and potassium carbonate (63 parts). The suspension is heated at 125° C. for 3 hours, cooled to room temperature and then cooled to 5° C. for 1 hour. The precipitate is filtered off and washed with a 50/50 mixture of 95% ethanol and 8% sodium hydroxide solution (2×250 parts). The filter cake is then slurried with a further 500 parts of the ethanol/sodium hydroxide solution mixture. After stirring at room temperature for 1 hour, the precipitate is filtered off and washed again with ethanol/sodium hydroxide solution mixture (5×100 parts), followed by water (250 parts) containing glacial acetic acetic acid (25 parts) and finally water (3×250 parts). The filter-cake is dried at 70° C. giving 140.4 parts of 1,5-bis(phenylthio) anthraquinone, mp (melting point) 256° C.

As Examples 2-24 the compounds listed in Table I below having the following general formula:

are each made by a similar method to that described in Example 1 with the appropriate quantity of the appropriate mono-, di-, tri, or tetra-chloro anthraquinone and the appropriate mercaptan.

TABLE I

COMPOUNDS OF FORMULA (III)

| Compound No. | $R_1$ | $R_2$ | $R_3$ | $R_4$ | $R_5$ | $R_6$ | $R_7$ | $R_8$ |
|---|---|---|---|---|---|---|---|---|
| 2 | SPh | H | H | SPh | SPh | H | H | SPh |
| 3 | $NH_2$ | $-SC_{12}H_{25}$ | $-SC_{12}H_{25}$ | $NH_2$ | H | H | H | H |
| 4 | $NH_2$ | $-SC_{12}H_{25}$ | H | $NH_2$ | H | H | H | H |
| 5 | $NH_2$ | $-S(CH_2)_3COC_3H_7-n$ | H | OH | H | H | H | H |
| 6 | $NH_2$ | $-SCH_2CONHPh(2,5-diCO_2Me)$ | H | OH | H | H | H | H |
| 7 | $NH_2$ | $-SC_2H_4OPh(4-COOEt)$ | H | OH | H | H | H | H |
| 8 | $NH_2$ | $-SC_2H_4OPh(4-OCH_2COOMe)$ | H | OH | H | H | H | H |
| 9 | $NH_2$ | $-SCH_2)_3COOCH(COOEt)_2$ | H | OH | H | H | H | H |
| 10 | $NH_2$ | $-SPh(4-OH)$ | H | OH | H | H | H | H |
| 11 | $NH_2$ | $-SPh$ | H | OH | H | H | H | H |
| 12 | OH | $-SPh$ | H | $NH_2$ | $NH_2$ | H | H | OH |
| 13 | SPh | H | H | H | H | H | $-SPh$ | H |
| 14 | $NH_2$ | $-SPh$ | H | H | $NH_2$ | $-SPh$ | H | H |
| 15 | $NH_2$ | H | H | $-SPh$ | H | H | H | H |
| 16 | $-SPh$ | H | H | $-NHCH_3$ | $-SPh$ | H | H | $-NHCH_3$ |
| 17 | $-SPh(4-Bu)$ | H | H | $-SPh(4-Bu)$ | $-SPh(4-Bu)$ | H | H | $-SPh(4-Bu)$ |
| 18 | $-SPh(4-Me)$ | H | H | $-SPh(4-Me)$ | $-SPh(4-Me)$ | H | H | $-SPh(4-Me)$ |
| 19 | $-SC_4H_9-n$ | H | H | H | $-SC_4H_9-n$ | H | H | H |
| 20 | $-SPh(3-Me)$ | H | H | $-SPh(3-Me)$ | H | H | H | H |
| 21 | $-SPh$ | H | H | $-SPh$ | $-SPh$ | H | H | H |
| 22 | $-SPh$ | H | H | $-NH_2$ | $-SPh$ | H | H | $NH_2$ |
| 23 | $-SPh(4-Me)$ | H | H | $-SPh(4-Me)$ | $-SPh(4-Me)$ | H | H | H |
| 24 | $-S(4-Bu)$ | H | H | $-S(4-Bu)$ | $-S(4-Bu)$ | H | H | H |

Where Ph = phenyl, Et = ethyl, Me = methyl, Bu = n-butyl.

EXAMPLE 25

100 g of the sodium salt of 1-nitro-anthraquinone-5-sulphonic acid is boiled in 500 g water to give a partial solution and cooled to room temperature. 150 g of concentrated sulphuric acid is added dropwise over 10 minutes and the mixture heated to reflux temperature. 330 g of a mixed sodium chlorate/sodium chloride solution containing 30.8 g sodium chlorate and 33.6 g sodium chloride is added over a period of 6 hours and the mixture refluxed for a further 3 hours. At the end of this period the mixture is filtered hot, washed with 800 g of hot water and dried at 80° C. The product is 1-nitro-5-chloroanthraquinone. (69.3 g: purity by HPLC 92%).

A solution of 39.1 g phenyl mercaptan in 62 ml dimethylformamide containing 16 g potassium carbonate is prepared by heating at 100° C. for 2 hours and cooled to 40° C. Ethanol (250 ml) and 36.2 g of the 1-nitro-5-chloroanthraquinone are added and stirred for 16 hours at 40° C. and allowed to cool to room temperature over 48 hours. The product is filtered washed with 46% aqueous ethanol (½ liter) slurried in 40% aqueous ethanol (250 ml) stirred for 30 minutes, filtered and washed with 100 ml of 40% aqueous ethanol and finally with ½ liter of water. It is then reslurried in 250 ml water, stirred for 30 minutes, filtered, washed with 250 ml water and 50 ml 20% aqueous ethanol and dried at 80° C. The product is 1-phenylthio-5-chloroanthraquinone (43.9 g purity by HPLC 94.2%) (+ minor amounts of dithiophenyl-AQ and dichloro-AQ; AQ=anthraquinone).

A mixture of 1.75 g 1-phenylthio-5-chloroanthraquinone, 0.4 g n-butylamine and 0.39 g potassium carbonate in 16 ml dimethylformamide is stirred at 120° C. for 3 hours after which a tlc runout indicates 66% reaction. A further 0.4 g n-butylamine and 0.39 g potassium carbonate are added and reaction at 120° C. continued for a further 8 hours. The mixture is cooled to room temperature, 20 ml ethanol added it is filtered and then washed with 36 ml 2 N NaOH/ethanol. The product is reslurried in 30 ml of the NaOH/ethanol, stirred for 30 minutes, filtered, washed with 26 ml NaOH/ethanol, followed by 50 ml water and 36 ml of 50% aqueous ethanol and dried at 50° C. This product is recrystalised from 200 ml of ethanol, reduced to 20 ml after filtration, washed with ethanol and dried at 80° C. The product is 1-phenylthio-5-n-butylaminoanthraquinone (0.95 g: m.p. 140–142C.).

EXAMPLE 26

A mixture of 3.12 g of tert-butyl phenyl mercaptan, 1.30 g potassium carbonate and 10 ml dimethylformamide are stirred at 120° C. for 2 hours and cooled to room temperature. To this are added 3.14 g of 1-n-butylamino-5-chloroanthraquinone, prepared as described below, and the reaction mixture refluxed for 5 hours. It is then cooled to room temperature, 20 ml of ethanol is added and the product, 1-n-butylamino-5-tert-butylphenylthioanthraquinone isolated and purified using the method described in the last stage of Example 25. The yield of product is 4.3 g in the form of a tar. This tar is dissolved in toluene and passed through a silica column using toluene as eluent and the main red fraction collected. After evaporating the toluene the product is recrystallised from ethanol and dried to give a yield of 2.5 g of 91.5% purity by HPLC and m.p. 168°–9° C.

The 1-n-butylamino-5-chloroanthraquinone used above is prepared by heating a mixture of 17 g 1-nitro-5-chloroanthraquinone, 5.1 g urea, 106 ml ethanol and 18.7 g n-butylamine under reflux for 48 hours. After this period 5.1 g urea and 68 ml n-butanol are added and refluxing continued for a further 16 hours. The reaction mixture is screened hot and the filtrates retained. The solid residue is washed with butanol, filtered hot and the filtrate retained. The combined filtrates are cooled to 0° C., filtered after 2 hours at 0° C. and the solid product washed with butanol. After drying at 80° C. the yield is 9 g and purity by HPLC is 82.8%.

EXAMPLE 27

A mixture of 2.97 g phenylmercaptan, 1.81 g potassium carbonate and 10 ml dimethylformamide are stirred at 120° C. for 2 hours and cooled to room temperature. To this are added 2.07 g 1-nitro-4,5-dichloro-8-anilinoanthraquinone and heating at 120° C. continued for 5 hours. At the end of the reaction period the mixture is cooled to room temperature, diluted with 20 ml ethanol, filtered and the product washed on the filter with 20 ml 50% aqueous ethanol. The first stage of purification involves reslurrying in 50% aqueous ethanol, 30 ml, stirring for 30 minutes, filtration, washing successively with 10 ml 50% aqueous ethanol, 30 ml water, and 20 ml ethanol and drying at 80° C. to give a yield of 2.35 g. The second stage of purification involves dissolution in 100 ml chloroform, passage through a silica column using chloroform as eluent and collecting the blue band, evaporation of the solvent, decantation washing with 30 ml methanol, slurrying in 20 ml of 40/60 petroleum ether, filtration, washing with 20 ml of petroleum ether and drying at 80° C. The yield of the product, 1-anilino-4,5,8-triphenylthioanthraquinone, is 2.3 g with m.p. of 289°–290° C. and a purity by HPLC of 97.5%.

The 1-nitro-4,5-dichloro-8-anilinoanthraquinone used as starting material is prepared by stirring a mixture of 10 g of 1,4,5-trichloro-8-nitroanthraquinone, 75 ml "Cellosolve" (Trade Mark) and 7.83 g aniline for 18 hours at 120° C. The product is isolated by cooling to room temperature, filtration, washing with 50 ml ethanol, reslurrying with 50 ml ethanol and filtration, mixing solid with 50 ml 2 N HCl filtration, washing acid-free with water (200 ml) and drying at 80° C. The crude product, yield 8.6 g, is purified by recrystallisation from chloroform, 50 ml, washing with a further 50 ml of chloroform and drying at 80° C. The yield is 5.9 g, the purity, by HPLC, 90.5% and the m.p. 216°–217° C.

EXAMPLE 28

The procedure of Example 27 is repeated except that in place of the 2.97 g of phenylmercaptan there is used 4.49 g of 4-tert-butylmercaptan. After isolation and purification in the same manner the yield of 1-anilino-4,5,8-tri(4'-tert-butylphenylthio)anthraquinone is 2.65 g of 91.5% purity by HPLC and m.p. 266°–268° C.

EXAMPLE 29

A mixture of 8.96 g of 4-tert-butylphenyl mercaptan, 3.73 g potassium carbonate and 10 ml dimethylformamide is stirred at 120° C. for 1 hour and cooled to room temperature. To the mixture is added 3.12 g 1,4,5-trichloanthraquinone and reaction continued for 18 hours at reflux. After cooling to room temperature and dilution with 20 ml ethanol the product is isolated and purified as as described in Example 26 to give 2.1 g of 1,4,5-tri(4'-tert-butyl-phenylthio)-anthraquinone m.p. 228°–229° C. and purity by HPLC 86.6%.

EXAMPLE 30

A mixture of 3.5 g 1-phenylthio-5-chloroanthraquinone, as prepared in Example 25, 2.5 g anhydrous sodium acetate, 0.15 g cupric acetate, 0.05 g copper powder and 25 g aniline are refluxed at 190° C. for 16 hours and cooled to room temperature. The product is slurried in 200 ml 2 N HCL the liquor decanted and a further 200 ml 2 N HCL added. The solid material is separated by filtration, reslurried into 200 ml water and filtered. The solid matter is dissolved in 100 ml chloroform, filtered through a silica plug and the filtrate evaporated to dryness. The dry material is then dissolved in 50% toluene/chloroform (100 ml) passed through a silica column using toluene as eluent and main red band is collected and separated from solvent by evaporation. The purification on a silica column is repeated using toluene alone as solvent and the resultant product is mixed with ethanol, filtered and dried at room temperature, yield 2.3 g consisting of 71.4% 1-anilino-5-phenylthioanthraquinone and 27.6% 1,5-bis-phenylthioanthraquinone. This material is boiled in 100 ml of 50:50 chloroform:ethanol until chloroform has evaporated, cooled to room temperature, filtered, washed with ethanol and dried at 50° C. The yield of 1-anilino-5-phenylthioanthraquinone is 1.4 g with m.p. 210°–212° C.

EXAMPLE 31

A mixture of 40 g 4,5-dinitrochrysazin, 800 ml pyridine is stirred and cooled to −30° C. and 14.6 g thiophenol is added over 5 minutes. The reaction mixture is held at −30° C. for 3 hours, warmed to room temperature, diluted with 800 g water and allowed to stand for 16 hours. The precipitate is filtered, washed with pyridine/water, water and reslurried and boiled with a dilute solution of HCl. After refiltration the solid is washed with methanol and extracted twice with methanol. The final yield after two recrystallisations from toluene is 12.5 g.

4 g of this product is reduced with 9.6 g sodium sulphide, 9H$_2$O and 1.25 g sulphur in water at 90° C. for 3 hours. The product is filtered hot and washed with hot water. This product is separated into seven components on a silica column using methanol as eluent and bands 4 and 7 collected. HPLC and Mass Spectral analysis show these to be essentially 1,8-dihydroxy-2,5-di-thiophenyl-4-aminoanthraquinone (Compound 31) and 1,8-dihydroxy-2-thiophenyl-4,5-diaminoanthraquinone (Compound 12).

Examples of properties of Compound Nos. 1 to 27 will now be given. In relation to the properties the following symbols are used:
  λmax=wavelength(s) of maximum absorption (nm)
  sol=solubility (weight % measured at 20° C.)
  S=order parameter (measured at 20° C.)
and the following liquid crystal hosts are referred to:
  i: Host A which is the commercially available material E7 (having a positive dielectric anisotropy) supplied by BDH Chemicals Ltd, Broom Road, Poole, Dorset, England: this consists of a mixture of cyanobiphenyls and a cyano-p-terphenyl.
  ii: Host B, which is the commercially available material E43 (having a positive dielectric anisotropy) supplied by BDH Chemicals Ltd, this consists of a mixture of cyanobiphenyls, a cyano-p-terphenyl and a cyanobiphenylcyclohexane compound.
  iii: Host C, which is the commercially available material ZLI 1132 supplied by E Merck Co., Postfach 4119, 6100 Darmstadt 1, German Federal Republic; this consists of a mixture having a positive dielectric anisotropy of 1-(4'-cyanophenyl)-4-n-alkylcyclohexane (PCH) compounds and a cyanobiphenylcyclohexane compound.
  iv: Host D, which is the commercially available material ZLI 1565 supplied by E Merck Co; this has a positive dielectric anisotropy and comprises mainly a mixture of PCH compounds;
  v: Host E, which is the commercially available material ZLI 1624 supplied by E Merck Co; this has a positive dielectric anisotropy and comprises mainly a mixture of PCH compounds;
  vi: Host F, which has a composition:

This has a weak dielectric anisotropy but may be formed into a material having a negative dielectric anisotropy by the addition of a small amount, eg 10% by weight, of 'negative' dopant, eg without significantly affecting its other properties.

Properties of Compounds Nos. 1 to 31 (which are the products of Example Nos. 1 to 31 respectively as disclosed above) have been found as listed in Table II.

An additional property of Compound No. 1 is as follows:
  S in Host F=0.82

Additional properties of Compound No. 2 are as follows:
  S in Host A=0.73
  S in Host C=0.8
  S in Host D=0.7
  S in Host E=0.78

The photostability of Compound Nos. 1 to 27 has been measured using (i) ultra-violet radiation (0.2 mw cm$^{-2}$ at 20° C.) and (i) ultra violet plus visible radiation from a Xenon Arc (1.5 kw at 40° C.). All of the Compounds showed good photostability at least comparable with the photostability of the anthraquinone dyes disclosed in the above mentioned European Specification. For example, the time taken for the absorbance of Compound No. 2 to fall to 90% of its original value was greater than 10000 hours for (i) and about 5000 hours for (ii) compared to 600 hours for (i) and 80 hours for (ii) for the compound 1-(4'-n-nonoxyanilino)-4-hydroxyanthraquinone disclosed in the above mentioned European Specification.

A suitable dark grey mixture made from dyes including Compounds of Formula (I) is as follows:

| Dye Mixture No 1 | | |
| --- | --- | --- |
| Compound No 1 | (yellow) | 2.0 parts by weight |
| Compound No 2 | (red) | 1.0 parts by weight |
| Dye A | (blue) | 0.8 parts by weight |

Where Dye A (as disclosed in our copending Patent Application) has the following formula:

TABLE II

| Compound No | Properties of Dye Compounds 1-27 | | | |
| --- | --- | --- | --- | --- |
| | S in Host A | S in Host B | Sol in Host B | λ$_{max}$ (nm) |
| 1 | | 0.80 | 1 | 447, 455 |
| 2 | | 0.8 | 1 | 524, 554 |
| 3 | 0.55 | | | 595, 638 |
| 4 | 0.56 | | | 589, 620 |
| 5 | 0.70 | | | 542, 580 |
| 6 | 0.57 | | | 545, 582 |
| 7 | 0.58 | | | 544, 582 |
| 8 | 0.61 | | | 542, 580 |
| 9 | 0.61 | | | 542, 580 |
| 10 | 0.52 | | | 530, 580 |

TABLE II-continued

Properties of Dye Compounds 1-27

| Compound No | S in Host A | S in Host B | Sol in Host B | $\lambda_{max}$ (nm) |
|---|---|---|---|---|
| 11 | 0.61 | | | 520, 558 |
| 12 | 0.61 | | | 605, 645 |
| 13 | 0.60 | | 9* | 445 |
| 14 | 0.51 | | | 515 |
| 15 | 0.60 | | | 520 |
| 16 | 0.71 | 0.78 | | 600, 650 |
| 17 | | 0.75 | | 524, 554 |
| 18 | | 0.75 | | 524, 554 |
| 19 | | 0.73 | | 447, 455 |
| 20 | | 0.78 | | 447, 455 |
| 21 | | 0.78 | >4.0 | 500, 518 |
| 22 | | 0.78 | 1.5 | 565, 605 |
| 23 | | 0.78 | 1.0 | 500, 520 |
| 24 | | | 1.5 | 520 |
| 25 | | 0.72 | >4.0 | 520 |
| 26 | | 0.68 | >4.0 | 520 |
| 27 | | 0.72 | 1.5 | 585, 612 |
| 28 | | 0.70 | | 585, 615 |
| 29 | | 0.73 | >4.0 | 500, 525 |
| 30 | | 0.70 | 3.5 | 485, 520 |
| 31 | | 0.73 | | |

*in Host A

Examples of liquid crystal devices embodying the second aspect of the present invention will now be described with reference to the accompanying drawings in which.

Figure 1:
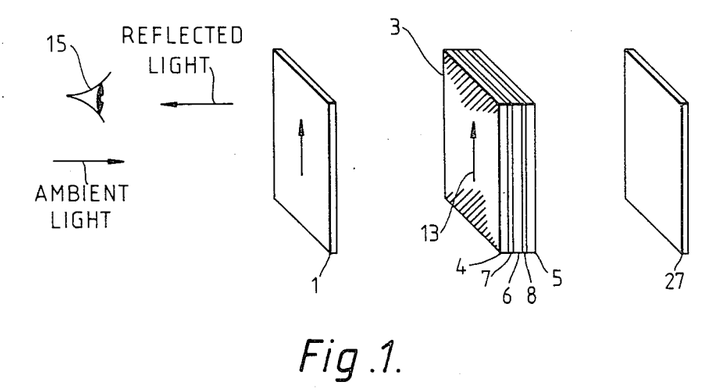
FIG. 1 is an exploded view of a Freedericksz effect display device embodying the present invention.

As shown in FIG. 1 a liquid crystal display of the Freedericksz effect (positive nematic) type includes a liquid crystal cell 3 comprising two glass slides 4, 5 containing a layer of liquid crystal material 6 which is basically a positive nematic mayerial together with a pleochroic dye. Electrodes 7, 8 eg of tin oxide are arranged on the inner faces of the slides 4, 5. A brushed aluminium reflector 27 may be located behind the slide 5.

Prior to assembling the cell 3 the slides 4, 5 (already bearing the electrodes 7, 8) are coated on their inner faces with silicon monoxide or magnesium fluoride. This coating is formed by evaporating a stream of eg silicon monoxide onto the slide at an angle of about 5° to the surface as for example described in U.K. Patent Specification No. 1,454,296. On assembly the slides are arranged with the evaporation direction on the two slides 4, 5 parallel to one another. With such coatings applied liquid crystal molecules at the coated surfaces lie in a single direction (parallel to the evaporation direction) and at an angle of about 25° to 35° typically about 30° to the adjacent slide surface. As a result the liquid crystal molecules lie in a parallel homogeneous texture as indicated by arrow 13 (FIG. 1). The dye molecules in guest-host relationship with the liquid crystal molecules are also roughly in this texture giving a relatively strongly coloured appearance to the cell 3 (which is black or grey if the dye absorbs uniformly throughout the visible spectrum).

A single polariser 1 placed in front of, or behind, the cell 3 (shown in front in FIG. 1) with its transmission axis parallel to the alignment direction of the liquid crystal material 6, will enhance the colour of the display in this state, the "off" state. By this arrangement the electric vector of the incident or refelcted light is confined roughly parallel to the transition of the dye molecules.

When a suitable voltage, eg a few volts, (greater than the threshold to give the effect) is applied between the electrodes 7 and 8, ie to give the "on" state, the molecules of the liquid crystal material are switched to the homeotropic texture, ie to lie parallel to the electric field along an axis perpendicular to the slides 4, 5. The dye molecules are also switched to this texture by the guest-host effect and have their long axes essentially parallel (ie they are essentially "end-on") to light incident on the cell 3 in a direction perpendicular to the slides 4, 5, effectively reducing their absorption of ambient light. This gives the cell 3 a relatively clear or weakly coloured appearance.

If the electrodes 7 and 8 cover only part of the inner surface of the slides 4 and 5 respectively the entire cell 3 will appear strongly coloured (ie strongly reflects) in the "off" state whereas in the "on" state only the region of the liquid crystal material 6 between the electrodes 7, 8 will appear clear or weakly coloured in the "on" state the remainder of the cell 3 appearing strongly coloured, ie remaining in the "off" state. (If the pleochroic dye absorbs uniformly throughout the visible spectrum the strong colouration will appear black or grey.)

Thus, by shaping the electrodes 7, 8 into discrete facing parts, eg bars of a digit separately connectable to a voltage source (not shown), symbols or letters may be displayed. This may be achieved by photoetching (in a known way) the layers, eg $SnO_2$, used to form the electrodes 7, 8 prior to assembly.

Figure 3:
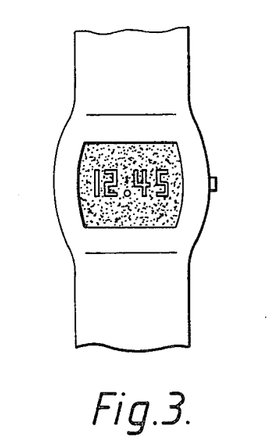
FIG. 3 is a front view of a watch having a liquid crystal display constructed as shown in FIGS. 1 and 2.

For example, in the watch display of FIG. 3 the electrodes 7, 8 are shaped to provide four seven bar numeric digits to display time; eg the digits are displaying 12.45 as shown in FIG. 3. A pulsed period dot P is also included, as in conventional watch displays, to indicate operation of the display.

Examples of suitable dyed liquid crystal material for use as the material 6 above are Dye Mixture No 1 (about 1% by weight) defined above dissolved in one of the two hosts Host A and Host B defined above (the thickness of the material 6 layer being 12 μm).

Figure 2:
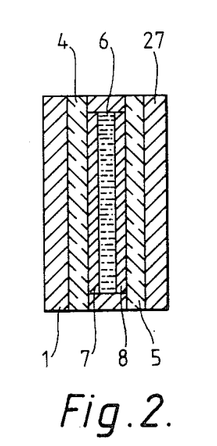
FIG. 2 is a sectional view of the device shown in FIG. 1.

In an alternative device embodying the second aspect of the present invention a cholesteric to nematic phase change effect is made in a known way. The method of construction is the same as that described above with reference to FIGS. 1 to 3 except that no $MgF_2$ or SiO coating is applied to the inner surfaces of the electrode bearing slides 4, 5, no polariser 1 is required and the liquid crystal material 6 in this case is essentially a long pitch cholesteric material (having a molecular helical pitch of the order of about 2 μm containing a pleochroic dye. A suitable material is one of the two hosts Host A and B defined above modified by the inclusion of 5% by weight of CB15 as defined below and containing the Dye Mixture No 1 defined above (about 1% by weight) (the thickness of the material 6 layer again being 12 μm).

In the "off" state (with no voltage applied) the cell 3 again appears strongly coloured in this case (as in the Freedericksz effect device). The liquid crystal material 6 in this state is in the focal conic texture which comprises an arrangement of random molecular helices. The dye molecules take up the same arrangement by the guest-host effect. The strong colouration (which may be black or dark grey) is because ambient white light incident on the material 6 via the slide 4 is partially absorbed by the dye molecules which are perpendicular or oblique to the light propagation direction.

In the "on" state a voltage (typically 10–15 volts) is applied between the electrodes 7, 8 sufficient to give the homeotropic texture, ie with the liquid crystal molecules between the electrodes 7, 8 essentially re-orientated to lie perpendicular to the slides 4, 5. The dye milecules between the elctrodes 7, 8 are re-orientated to this arrangement by the guest-host effect. The region between the electrodes 7, 8 appears clear or weakly coloured in this state (as with the Freedericksz effect device) because the dye molecules are essentially "end-on" to ambient light propagating in a direction perpendicular to the cell 3, ie perpendicular to the slides 4, 5 (via the slide 4).

We claim:

1. A material suitable for a guest-host liquid crystal device comprising a solution of a liquid crystal material and a pleochroic dye, wherein the pleochroic dye comprises at least one compound having a formula:

Formula (I)

wherein:
R represents a group selected from alkyl and aryl;
each of A, B and C independently represents a group selected from H, —SR and —NR$_2$R$_2$ groups, wherein R$_1$ and R$_2$ are independently selected from H, alkyl and aryl;
provided that at least one of A, B and C is other than H and that if two of A, B and C are H, then the third is NR$_1$R$_2$.

2. A material as claimed in claim 1 in which the group R represents a monocyclic aryl group.

3. A material as claimed in claim 2 in which the group R represents a phenyl group.

4. A material as claimed in claim 1 in which the group R represents a phenyl group substituted in the para or meta position relative to the anthraquinone nucleus by a group selected from lower alkyl, lower alkoxy, halo, NO$_2$, OH and NR$_1$R$_2$ where NR$_1$R$_2$ is as defined in claim 1.

5. A material as claimed in claim 1 in which the group NR$_1$R$_2$ is NHR$^1$, where R$^1$ is selected from H, monocyclic aryl and alkyl containing from 1 to 5 carbon atoms.

6. A material as claimed in claim 5 in which B is NHR$^1$, where R$^1$ is as defined in claim 5, and A and C are both hydrogen.

7. A material as claimed in claim 1 in which of the three groups A, B and C, two are —SR groups and the third is hydrogen, R being as defined in claim 1.

8. A material as claimed in claim 1 in which of the three groups A, B and C, one is hydrogen and the other two are —NR$_1$R$_2$ groups, R$_1$ and R$_2$ being as defined in claim 1.

9. A material as claimed in claim 1 in which of the three groups A, B and C, one is hydrogen, one is SR and one is NR$_1$R$_2$.

10. A material as claimed in claim 1 in which the three groups A, B and C are SR groups, R being as defined in claim 1.

11. A material as claimed in claim 1 in which the three groups A, B and C are NR$_1$R$_2$ groups, R$_1$ and R$_2$ being as defined in claim 1.

12. A material as claimed in claim 1 in which the three groups A, B and C are respectively —SR, NR$_1$R$_2$ and NR$_1$R$_2$ groups; R, R$_1$ and R$_2$ being as defined in claim 1.

13. A material as claimed in claim 1 in which the three groups A, B and C are respectively —NR$_1$R$_2$, —SR and —NR$_1$R$_2$; R, R$_1$ and R$_2$ being as defined in claim 1.

14. A material as claimed in claim 1 in which the three groups A, B and C are respectively —NR$_1$R$_2$, —NR$_1$R$_2$ and —SR; R, R$_1$ and R$_2$ being as defined in claim 1.

15. A material as claimed in claim 1 in which the three groups A, B and C are respectively —SR, —SR and —NR$_1$R$_2$; R, R$_1$ and R$_2$ being as defined in claim 1.

16. A material as claimed in claim 1 in which the three groups A, B and C are respectively —SR, —NR$_1$R$_2$ and —SR; R, R$_1$ and R$_2$ being as defined in claim 1.

17. A material as claimed in claim 1 in which the three groups A, B and C are respectively —NR$_1$R$_2$, —SR and —SR; R, R$_1$ and R$_2$ being as defined in claim 1.

18. A material as claimed in claim 1 in which the compound of Formula (I) has the formula:

19. A material as claimed in claim 1 in which the compound of Formula (I) has the formula:

20. A material as claimed in claim 1 in which the compound of Formula (I) has the formula:

21. A material as claimed in claim 1 in which the compound of Formula (I) has the formula:

22. A material as claimed in claim 1 in which the compound of Formula (I) has the formula:

23. A material as claimed in claim 1 in which the compound of Formula (I) has the formula:

24. A material as claimed in claim 1 in which the compound of Formula (I) has the formula:

25. A material as claimed in claim 1 in which the compound of Formula (I) has the formula:

26. A material as claimed in claim 1 in which the compound of Formula (I) has the formula:

27. A material as claimed in claim 1 in which the compound of Formula (I) has the formula:

28. A material as claimed in claim 1 in which the compound of Formula (I) has the formula:

29. A material as claimed in claim 1 in which the compound of Formula (I) has the formula:

30. A material as claimed in claim 1 in which the compound of Formula (I) has the formula:

31. A material as claimed in claim 1 in which the compound of Formula (I) has the formula:

32. A material as claimed in claim 1 in which the pleochroic dye comprises a mixture of dyes at least one of which is a compound of Formula (I) as defined in claim 1.

33. A material as claimed in claim 32 in which the pleochroic dye includes a mixture of a blue dye and an orange dye, the orange dye being a compound of Formula (I).

34. A material as claimed in claim 33 in which the mixture also includes a yellow dye or a red dye or both and comprises a neutral colored mixture.

35. A material as claimed in claim 32 in which the pleochroic dye comprises a neutral colored mixture of a yellow dye, a red dye and a blue dye at least one of which is a compound of Formula (I).

36. A material as claimed in claim 1 in which the liquid crystal material comprises mainly 4-n-alkyl-or alkoxy-4'-cyanobiphenyl compounds.

37. A material as claimed in claim 1 in which the liquid crystal material comprises mainly 1-(4'-cyanophenyl)-4-n-alkyl-cyclohexane compounds.

38. A material as claimed in claim 1 in which the liquid crystal material is suitable for a cholesteric to nematic phase change effect device and comprises a nematic liquid crystal material together with a chiral agent.

39. A material as claimed in claim 36 in which the liquid crystal material is suitable for a cholesteric to nematic phase change effect device and comprises a nematic liquid crystal material together with a chiral agent.

40. A material as claimed in claim 37 in which the liquid crystal material is suitable for a cholesteric to nematic phase change effect device and comprises a nematic liquid crystal material together with a chiral agent.

41. A liquid crystal electro-optical device including two electrically insulating substrates at least one of which is optically transparent, electrodes on the inner surfaces of the substrates and a film of dielectric material contained between the substrates, wherein the improvement comprises the dielectric material being a dyed liquid crystal material as claimed in claim 1.

42. A liquid crystal device as claimed in claim 41 in which the device is a cholesteric to nematic phase change effect device.

43. A liquid crystal device as claimed in claim 41 in which the device is a Freedericksz effect device.

44. A liquid crystal device as claimed in claim 41 in which the device is a twisted nematic effect device.

* * * * *